L. H. THULLEN.
CONTROL SYSTEM FOR ELECTRIC MOTORS.
APPLICATION FILED JAN. 10, 1914.
1,323,929.
Patented Dec. 2, 1919.
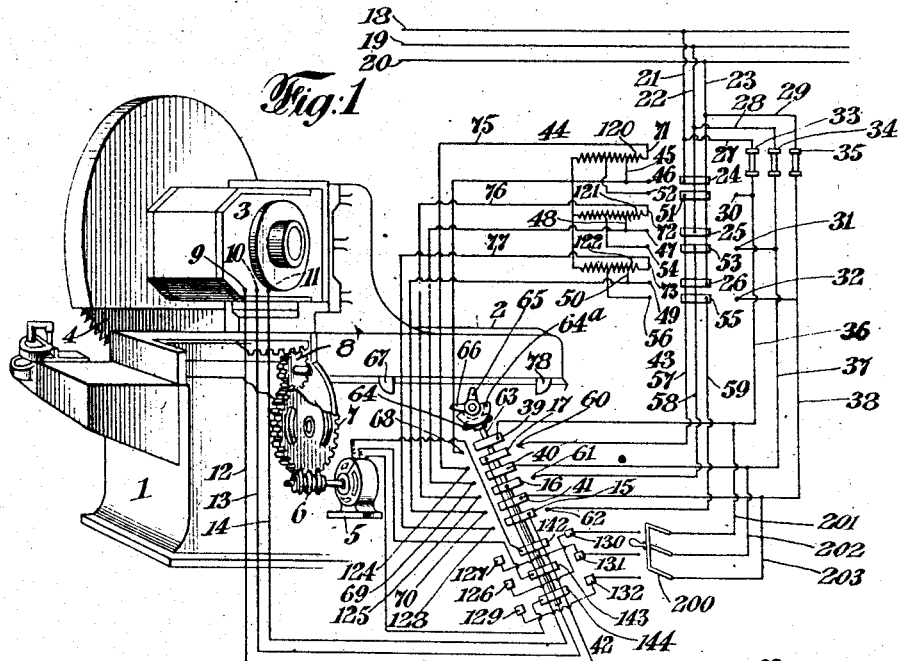
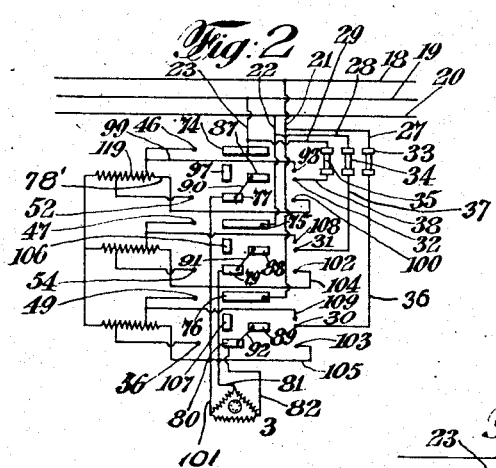
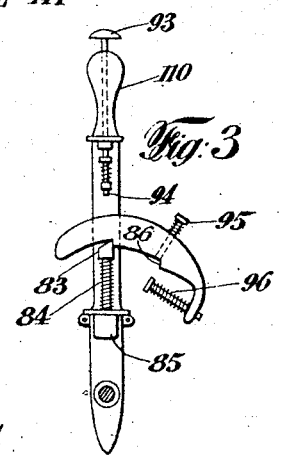
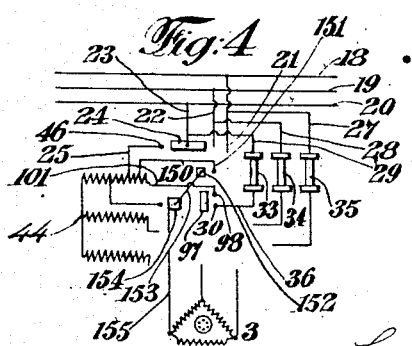
INVENTOR
Louis H. Thullen,
BY
Kenyon & Kenyon
his ATTORNEYS

UNITED STATES PATENT OFFICE.

LOUIS H. THULLEN, OF PHILADELPHIA, PENNSYLVANIA.

CONTROL SYSTEM FOR ELECTRIC MOTORS.

1,323,929.  Specification of Letters Patent.  Patented Dec. 2, 1919.

Application filed January 10, 1914.  Serial No. 811,299.

*To all whom it may concern:*

Be it known that I, LOUIS H. THULLEN, a citizen of the United States, residing in the city and county of Philadelphia, State of Pennsylvania, have invented a novel Control System for Electric Motors, of which the following is a specification.

My invention relates to a novel means or system of automatically controlling alternating current, electric motors, and has particular reference to the control of alternating current motors, when used in connection with feed carriages for friction saws or analogous mechanism having a moving table, or where the motor has a varying load or is subject to periodical heavy overload alternating with light or no load.

Generally, an alternating current motor has a pull-out torque of about two and a half times its normal rating. It is quite often desirable to operate such a motor periodically at four to five times its normal rating, and in order to accomplish this, I have devised a novel means whereby, during short periods of overload, a voltage higher than normal can be impressed upon the motor, thereby increasing the pull-out torque, as the pull-out torque of a motor is in proportion to the second power of the applied voltage. In connection with this, I use a means, whereby when the motor is running idle, or at light load, normal voltage is impressed on the motor. It is also possible to so build a motor that the pull-out torque will be in excess of two and a half times the pull-out torque of a standard motor, but when a motor is designed in this manner, it is either excessively large, has a large magnetizing current or the magnetic circuit is operated at a very high density. To use a motor designed in this way, it is desirable to apply a voltage lower than normal during light loads or when running empty, and my novel means for doing this constitutes the object of said invention.

To the above ends my invention in its broad aspects consists of the novel combination of an electric motor, a starting transformer therefor, and a novel means in connection with said starting transformer to apply higher than line voltage to said motor.

It further consists of a novel combination of a starting means, a transformer, fuses and a novel arrangement of circuits, which is capable of general application, but is especially applicable to the control of alternating current motors used in connection with mechanism having a moving element, as a feed carriage for friction saws, or where the motor has a varying load.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a friction saw or analogous mechanism equipped with a novel control system embodying my invention, two controllers being shown diagrammatically with the necessary starting transformer and the fuse cut-out device.

Fig. 2 represents diagrammatically a controller so arranged and built that a higher than normal voltage can be applied to an alternating current motor when one set of fuses only are used.

Fig. 3 represents a handle and its adjuncts to be used in connection with the controller shown in Fig. 2, and so arranged that after the motor reaches normal speed at normal voltage, a latch can be released and the controller thrown in position of higher than normal voltage, but must be held there manually, and if the hand is removed from the controller, the controller will immediately go back to the normal voltage position.

Fig. 4 represents one phase of a controller which is used in connection with a motor that is so designed that its normal voltage is at less than line voltage, and when operating at line voltage, the starting transformer is cut out.

Similar numerals of reference indicate corresponding parts in the figures.

Referring to the drawings:—

Referring to Fig. 1, 1 designates the bed or housing of a sawing or analogous mechanism, 2 the carriage or reciprocating part, on which is mounted the saw or duty motor 3, and on the end of whose shaft revolves the disk or saw 4. The feed motor 5 is used to reciprocate the table 2 backward and forward by means of the worm 6 and the gears 7 and 8, which latter meshes with a suitable rack. In this figure, I have shown a three-phased motor, but it is well understood that in this art, a motor of any number of phases can be used for this purpose.

In connection with the motor 3,—9, 10 and 11 designate three terminals for the leads 12, 13 and 14, which connect to the controller segments 15, 16 and 17, respectively, of the controller 42. The cables 18, 19 and 20, seen in the upper portion of Fig. 1 are a source of three-phased alternating currents and from this source are connected cables 21, 22 and 23, respectively, which lead to segments 24, 25 and 26 of the controller 43. Cables 27, 28 and 29 are also attached to the cables 21, 22 and 23, respectively, and lead to the controller points 30, 31 and 32, respectively, through the medium of fuses 33, 34 and 35, while from said fuses 33, 34 and 35 are also taken the cables 36, 37 and 38, respectively, which go to the segments 39, 40 and 41.

44 diagrammatically shows a starting transformer for the motor 3, and in this starting transformer, I also use a second winding, or so arrange the taps that I can either get a higher than normal voltage or can operate the motor at a point lower than normal. In the transformer 44, I here show a tap 45 which, in this case, applies normal voltage when the controller is in the extreme left position and contact is made with the contact 46 with the controller segment 24, and the current is then applied to the transformer for the one phase through the cable 21 from the one main 18 of a source of alternating current supply.

When the controller 43 is in this position, current is also supplied to the other two phases in the following manner, from the main 19 of the source of supply through the cable 22, controller segment 25, contact 47, tap 48 to the other winding of the transformer, and for the other phase, through the medium of main 20 from the source of supply, cable 23, controller segment 26, contact 49 and tap 50 to the third winding of the starting transformer 44. When the controller is in this position, contact is made between segment 51 and contact 52, segment 53 and contact 54, and segment 55 and contact 56, whereby current at a reduced voltage is impressed upon the lines or cables 57, 58 and 59 to the contacts 60, 61 and 62 of controller 42. It can be readily seen that when the controller 43 is in this position, that normal voltage is applied to the starting transformer, and lower than normal voltage is applied to the motor 3 to start same when the controller 42 is in the extreme right position. When the controller 42 is in the extreme right position, low voltage is applied to the motor 3, as follows,—segment 17 is in contact with contact finger 60, segment 16 is in contact with contact finger 61, and segment 15 in contact with contact finger 62.

Both controllers are in this position when the motor 3 is started, as it is well known to those skilled in this art, that it is desirable to start an alternating current motor at less than normal voltage.

After motor 3 has attained approximately normal speed, the controller 43 is shifted to the right, at which time contact segment 51 is in contact with contact finger 30, controller segment 53 is in contact with contact finger 31, and controller segment 55 is in contact with contact finger 32. The movement to the right therefore connects motor 3 to the mains 18, 19 and 20 directly without the medium of transformer 44, and normal voltage is applied to said motor.

63 designates the shaft that operates the cylinder or controller 42. On the end of the shaft 63 is a gear 64. Two projections 65 and 66, not in the same plane, are fastened to a gear 64ª which meshes with gear 64. Projections 65 and 66 are here shown in the position they assume when the controller 42 is in the extreme right position. When the table 2 reaches its extreme position to the right, at which time it is desirable to apply a higher than normal voltage to the motor 3, the lug or tappet 67, carried by said cable comes in contact with the projection 65, and the projection 65 is moved to a horizontal position and the controller cylinder 42 is moved to the extreme left, thereby causing the segment 39 to come in contact with contact finger 68, controller segment 40 to come in contact with contact finger 69, and controller segment 41 to contact with contact finger 70, and segments 15, 16 and 17 in engagement with contacts 128, 125 and 124, respectively. This brings the motor 3 in connection with the high voltage tap on the transformer taps 71, 72 and 73 of the transformer 44 through the medium of cables 75, 76 and 77, respectively, and also brings segments 142—143 and 144 into engagement with contacts 130, 131 and 132, respectively, to reverse motor 5. When the table 2 reaches the extreme left point of travel, the lug or tappet 78 on the table 2 comes in contact with the projection 66, thereby moving the controller 42 to the extreme right position, impressing normal voltage on the motor 3 and again reversing the motor 5. Normal voltage remains on the motor 3 until the table is moved to the extreme right position, as above described.

The segments 142, 143 and 144 and the contacts 130, 131, 132 on one side, and contacts 127, 128 and 129 on the other side of the controller 42, constitute the reversing switch for the motor 5. When the segments 142, 143 and 144 are moved to the right, the motor 5 runs in one direction, and when these segments are moved to the left, the motor is reversed and moves the carriage 2 in the opposite direction. This reversing switch is operated through the tappets 67 and 78 and the projections 65 and 66 through the medium of the gears 64, 64ᵃ and the shaft 63, in a manner which will be readily appreciated from an inspection of the drawings. A switch 200 is provided for connecting or disconnecting the reversing switch to the line through the branch contacts 201, 202 and 203. This switch operates in the well-known manner.

The tappets 67 and 78 are adjustable on the carriage 2 so that the points of reversal of the feed motor 5, and the increase or decrease of voltage being impressed on the duty motor 3, may be changed to suit the circumstances. It is desirable that the increased or abnormal voltage be applied to the motor 3 a substantial length of time before the work carried by the carriage 2 is presented to the saw. This is desirable for the reason that the saw has considerable inertia and should be permitted to be brought up to full speed before it comes in contact with the work. It is evident that by properly placing the tappet 67 so as to increase the voltage on the duty motor while the work is a substantial distance away from the saw, the saw will be brought up to full speed before the motor 5 can be reversed and bring the work which is upon the carriage 2 in contact with the saw.

It will be noticed that in this invention, I make use of an auxiliary winding on the starting transformer for obtaining a higher than normal voltage, by which means I save a separate transformer and by putting in or connecting another winding, I utilize the starting transformer which is a less expensive transformer than a regular one, as it is only in circuit part of the time, and therefore can be built with less copper and iron. The controllers 42 and 43 may be combined into a single controller and still come within my invention.

In Fig. 2, I have diagrammatically shown a controller operated by the handle seen in Fig. 3. 3 designates the same motor as shown in Fig. 1, but diagrammatically illustrated. 18, 19 and 20 designate a source of three-phase alternating current supply, the cables 21, 22 and 23 being connected thereto, as already described with respect to Fig. 1. From the cables 21, 22 and 23 are leads 27, 28 and 29 attached to the fuses 33, 34 and 35, to which are attached leads 36, 37 and 38, and connected to the contact fingers 30, 31 and 32, substantially as already described.

44 is an auto transformer, similar to that shown in Fig. 1, the connections and taps also being similar. When the handle shown in Fig. 3 is moved to the extreme left, the controller is revolved to the left in such a manner that segment 74 makes contact with contact finger 46, thereby applying line voltage to one phase of the transformer 44. At the same time segment 75 makes contact with contact finger 47, which impresses line voltage on the other phase of transformer 44, and segment 76 makes contact with contact finger 49, thereby impressing line voltage on the other winding of transformer 44.

Simultaneously with this operation, the segment 77 makes contact with contact finger 52, thereby impressing less than line voltage on one phase of the motor 3, through the medium of cable 78'. Simultaneous with this, segments 79 and 80 make contact with contact fingers 54 and 56, thereby impressing less than line voltage on motor 3, through the medium of cables 81 and 82. When the controller is in this position, which is the starting position, less than line voltage is applied to the motor in a manner well known to those skilled in the art, as is evident.

Referring now particularly to Fig. 3, it will be seen that when the controller is in this position, the latch 83 is depressed against the spring 84, moving the piston in dash pot 85, which may be of any conventional type, downwardly. The handle, which is in its off position as seen in Fig. 3, is first moved to the left and is then quickly moved to the right until the latch 83 comes against the stop 86. This particular cycle of the controller handle is known in this art, and *per se* forms no part of my invention. When the handle occupies a position to the right of that seen in Fig. 3, and the latch 83 is against the stop 86, the controller, as shown in Fig. 2, is also moved to the right, so that segments 87, 88 and 89 make contact with the contact fingers 32, 31 and 30, respectively, thereby impressing full line voltage on the motor 3, through the medium of cables 27, 28 and 29, fuses 33, 34 and 35, cables 36, 37 and 38, connections 90, 91 and 92, and cables 78, 81 and 82.

When it is desirable to impress higher than normal voltage, or a higher voltage than when the latch 83 of the controller handle is against stop 86, as above described, the button 93 is pressed downwardly, thereby engaging the end of the rod 94 with latch 95, which in turn depresses latch 83, and makes it possible to move the controller handle still farther to the right and against the tension member 96. When the handle seen in Fig. 3 is in this extreme right hand position, the controller is moved still farther to the right, so that segment 97 makes contact with both contact fingers 32 and 98, (see Fig. 2), thereby making a path for one phase of the current through the fuse 35, lead 38, contact 97, cable 99, and impressing normal or line voltage on one winding of the transformer 44, as was done when the controller was in the position to the left. Simultaneously with this, the segment 77 makes contact with contact finger 100, thereby impressing higher than normal voltage on the motor 3, from the one phase of the transformer 44 through the medium of cable 101 and cable 78. Simultaneously with this, the other two segments 79 and 80 make contact with contact fingers 102 and 103, thereby impressing higher than normal voltage through two phases from the transformer 44 on the motor 3, through the medium of cables 104 and 105, and cables 81 and 82, (see Fig. 2). It will be noticed that at the same time, segments 106 and 107 make contact with the contact fingers 31 and 108, impressing line voltage on one winding of the transformer 44, and the other winding of the transformer 44 by making connections between contact fingers 30 and 109.

It will also be noticed that when the controller is moved to the extreme right hand position and beyond notch 86, the controller segments 87, 88 and 89 disengage with the contact fingers 32, 81 and 30. It will also be noticed that the fuses 33, 34 and 35 are in the circuit path, when the latch 83 of the controller handle 110 shown in Fig. 3, is pressed against the notch 86, and also when said controller is at its extreme righthand position. It will be noticed, referring to Fig. 3, that it is necessary to keep hold of the handle 110, which tends to be thrown to the left on account of the tension of the compression member 96. Should the hand be removed from handle 110, said handle will immediately go to normal position and the latch 83 will be against the notch 86, thereby impressing line voltage or lower voltage on the motor 3, than when said controller handle was in the extreme right position.

By this means, the table, 2, which is controlled by motor 5, is slowed down and accelerated as the load increases or decreases on motor 3, the resultant action being substantially as described in my previous Patent, No. 1,070,638.

Referring now to Fig. 4, 18, 19 and 20 designate mains which are a source of current supply, and 21, 22 and 23 designate taps therefrom, while 27, 28 and 29 designate branch taps leading to the fuses 33, 34 and 35. The transformer starter is shown by 44. For simplicity only, connections to one phase of this controller is shown, the other phases having similar connections.

When the controller is to the left or in starting position, one phase of the transformer is connected to one phase 20 of the source of current supply through the tap 25, contact finger 46, segment 24 and tap 23.

After the motor attains speed, the controller is then quickly shifted to the right or at a point of normal voltage, for which the motor is designed, and at which point the motor operates empty or with normal or light load. As a starting transformer is built to only start, the motor and the iron are operated at too high a density with normal winding of the transformer for continuous operation, so I here connect the source of supply to a connection on the winding so that more of the winding of the transformer is in circuit, thereby operating the iron core of the transformer at the proper density for continuous connection. At the same time, the motor is also connected to a different tap to give the proper voltage for the same, which is lower than line voltage. When the controller is in this position, the current is from the line 20 through the taps 23 and 29, fuse 33, line 36, contact finger 30, segment 97, contact finger 98 and tap 101, to one phase of the starting transformer 44. Simultaneously with this, connection is made at a lower voltage point of the transformer with the motor through the tap 150, contact finger 151, segment 152, connection 153, and main 155, to one phase of the motor 3.

When it is desired to operate the motor at heavy overload and at a higher voltage than which it is normally designed to operate continuously, the controller is moved to the extreme right hand position, at which time the motor is directly connected to the source of current supply and the transformer out of circuit. At this time, controller segment 154 makes contact with contact finger 30, and segment 97 is disconnected from contact fingers 30 and 98.

It will now be apparent that I have devised a novel and useful construction of a control system for electric motors, which embodies the features of advantages enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. The combination of a plurality of electric motors, one of which operates under varying load and the other of which is reversible, a controller therefor, automatic means for applying one voltage to the varying load motor when the other motor is running in one direction and for reversing the other motor and applying a different voltage to the varying load motor when the second motor is operating in the reverse direction.

2. The combination of a plurality of electric motors, one of which operates under varying load, a controller therefor, means for applying normal voltage to the varying load motor when the other motor is running in one direction and automatic means for reversing the direction of the second motor and applying abnormal voltage to the varying load motor when the second motor is operating in the reverse direction.

3. The combination of a plurality of electric motors, one of which operates under varying load, a controller therefor, means for applying one voltage to the varying load motor when the other motor is running in one direction, means for applying different voltage to the varying load motor when the second motor is operating in the opposite direction and means for stopping the second motor.

4. The combination of a motor, a saw driven thereby, a carriage adapted to bring said saw into coöperative relation with the material to be sawed, an electric feed motor to move the carriage, a transformer for said saw motor, a controller for said feed motor and said saw motor electrically connected to said transformer, means to obtain from said transformer normal and abnormal saw motor voltage, means for operating said carriage in one direction while a low voltage is on said saw motor and in the opposite direction after abnormal voltage has been applied to the saw motor for an appreciable length of time and automatic means for again impressing normal voltage on said saw motor.

5. The combination of an electric motor, a carriage driven thereby, a second electric motor, a starter for said second motor, a controller for both motors, means controlled by the movement of the carriage for applying normal voltage to said second motor when the carriage is operating in one direction and abnormal voltage when the carriage is operating in the reverse direction.

6. The combination of a duty motor, a tool actuated thereby, a movable carriage, a feed motor for reciprocating said carriage and means operated by the carriage for controlling both of said motors whereby abnormal voltage is applied to the duty motor when the carriage is operated in one direction and normal voltage is applied to the duty motor when the carriage is operated in the reverse direction.

7. The combination of a duty motor, a tool actuated thereby, a movable carriage, a feed motor for actuating said carriage, means for applying one voltage to the duty motor when the carriage is moving in one direction and means for applying a different voltage to the duty motor for reversing the feed motor to move the carriage in the opposite direction.

8. The combination of a duty motor, a tool actuated thereby, a movable carriage adapted, when moving in one direction, to present work to said tool, a feed motor for actuating said carriage, means for applying voltage above normal to the duty motor when the carriage is presenting work to said tool and for applying normal voltage to said duty motor when the carriage is moving in the opposite direction.

9. The combination of a duty motor, a tool actuated thereby, a reciprocable carriage adapted, when moving in one direction, to present work to said tool, a feed motor for reciprocating said carriage, a transformer for impressing upon said duty motor normal motor voltage when said carriage is moving the work away from said tool and means for connecting said duty motor directly to a line carrying voltage higher than normal motor voltage when said carriage is presenting work to said tool.

10. In a system of the character described, the combination of a duty motor, a disk actuated thereby, a movable carriage, a feed motor for actuating said carriage, projections on said carriage, a controller, contact devices on said controller adapted to be actuated by said projections, whereby said feed motor is automatically reversed when said carriage reaches the extremity of its movement in either direction and the voltage on said duty motor is normal or abnormal depending upon the direction of movement of said carriage.

LOUIS H. THULLEN.

Witnesses:
E. HAYWARD FAIRBANKS,
C. D. McVAY.